UNITED STATES PATENT OFFICE.

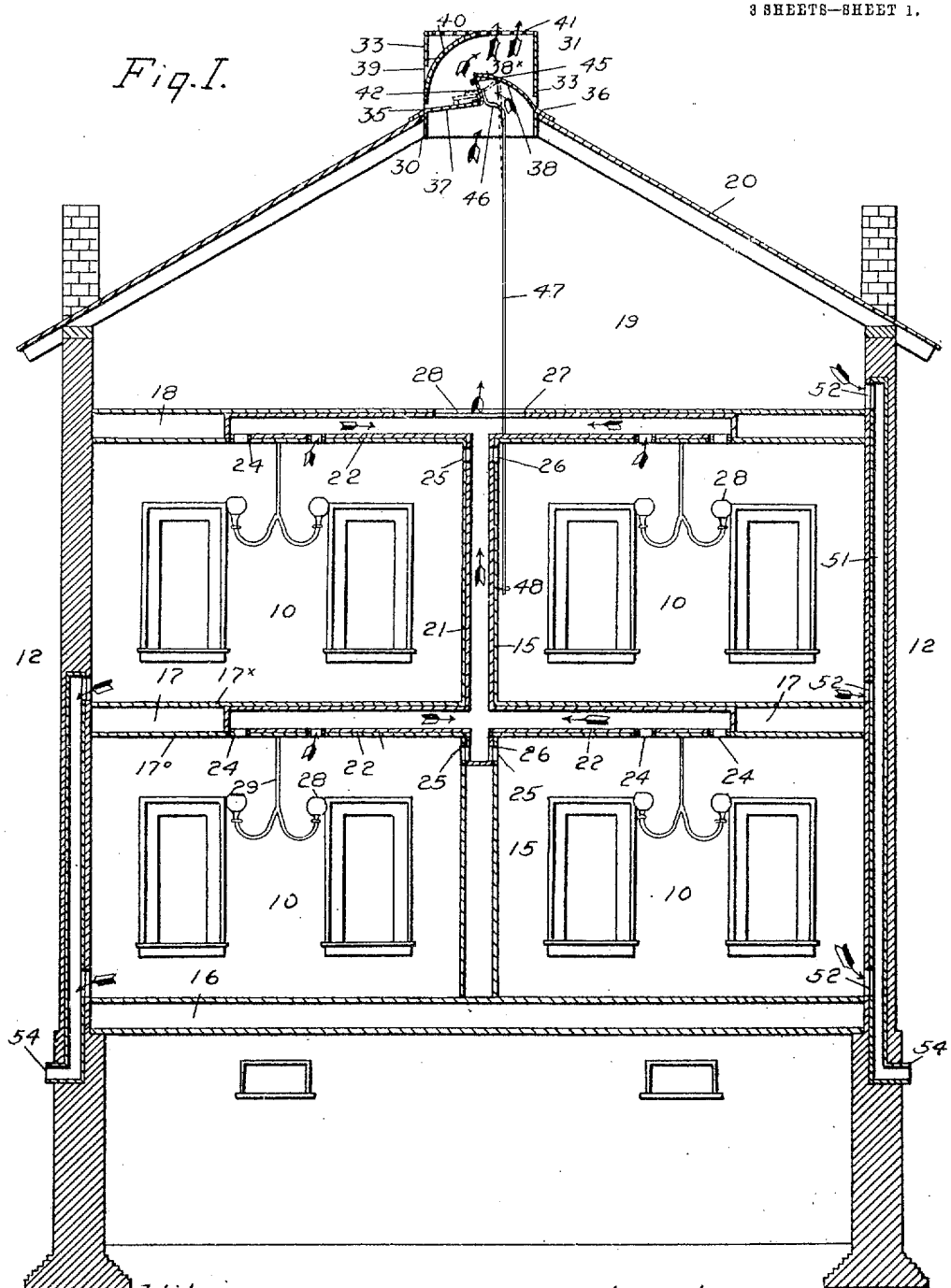

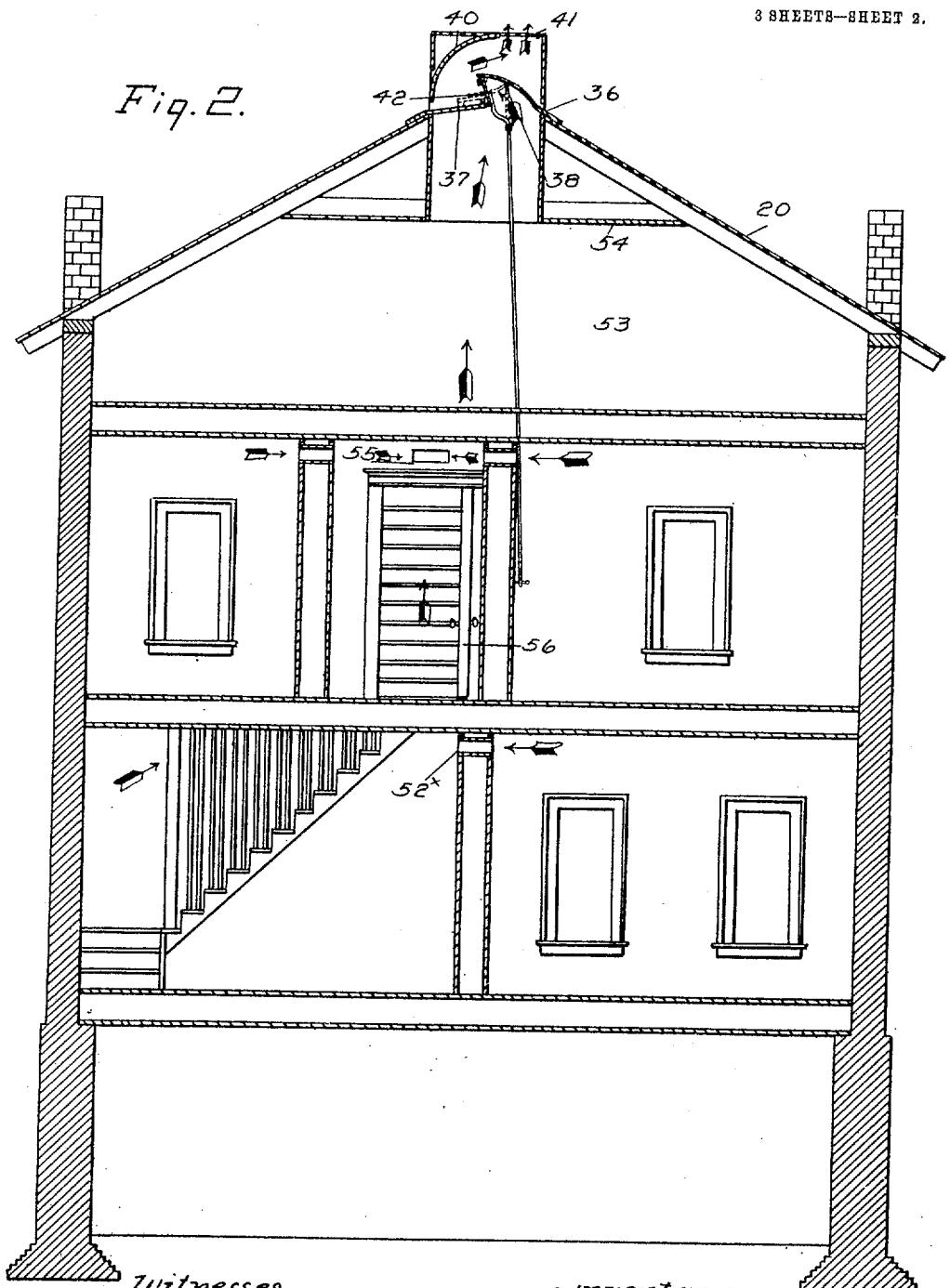

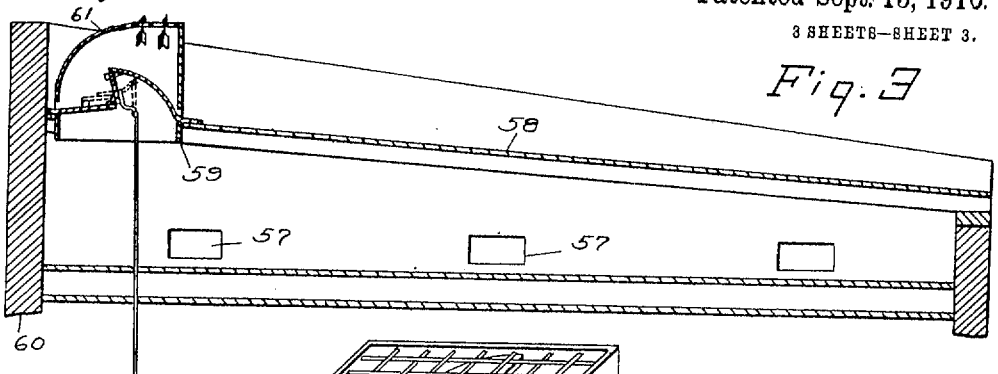
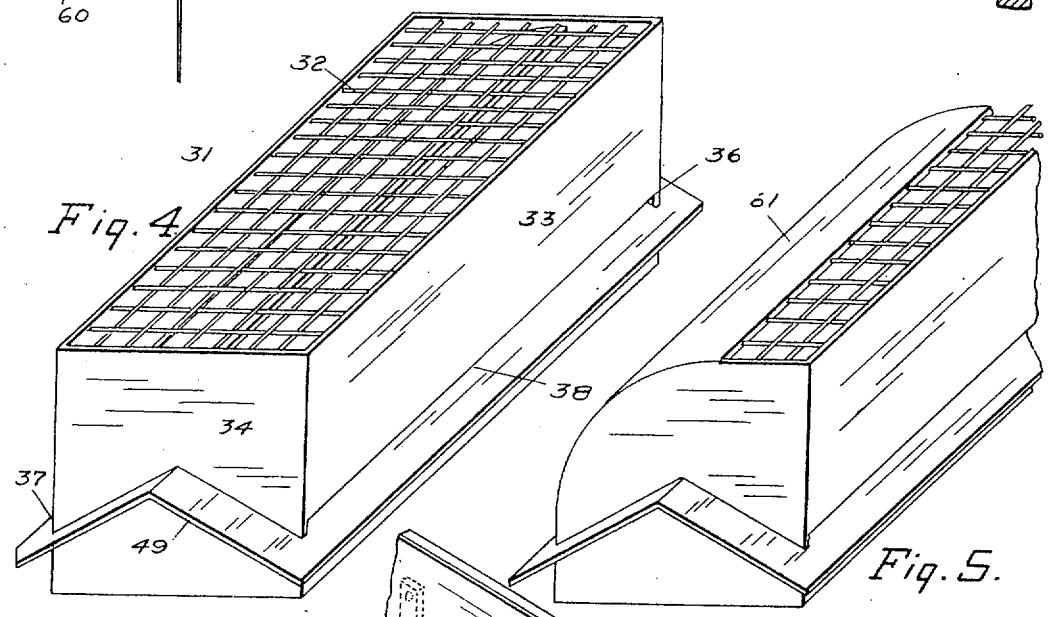
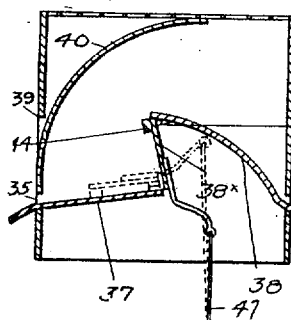
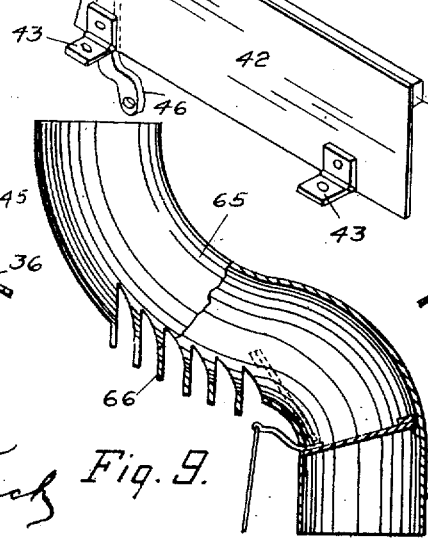

RUSH W. CARRINGTON, OF KANSAS CITY, MISSOURI.

VENTILATOR.

969,842.  Specification of Letters Patent.  Patented Sept. 13, 1910.

Application filed September 14, 1909. Serial No. 517,735.

*To all whom it may concern:*

Be it known that I, RUSH W. CARRINGTON, a citizen of the United States of America, residing at Kansas City, in the county of Jackson and State of Missouri, have invented certain new and useful Improvements in Ventilators; and I do hereby declare that the following is a full, clear, and exact description of the invention, reference being had to the accompanying drawings, forming a part of this specification.

The invention relates to inductive ventilation of any confined air space, such as the rooms of buildings, school houses, air shafts, and various other inclosures where ventilation is not aided by suction, or blast pneumatic agencies.

The object of the invention is: First, to produce by induction and atmospheric rarefaction currents of air, or gases, which will disturb the inertia of a body of dead air and cause its removal. Second, to obtain momentum of the molecules of heated air, so as to produce a vacuum for the incoming of cooling currents of air. Third, to expel heated air by direct and indirect exposure of the heated air to the atmosphere with the rarefaction of the heated air from solar heat. Fourth, to obtain a circulation of air in connected apartments, and remove the vitiated air from confined air spaces.

The invention consists in certain novel and peculiar features in ventilation, and in construction and organization of parts for accomplishing the invention, hereinafter fully described and claimed.

In the various conditions of air as it is found in dwellings, schools, and the like, one is which heat performs an energy, and the other in which gases serve to not only vitiate, but adds to the specific gravity of the air. In both conditions of the air they may be said to be "dead" as respects their own inertia to escape from a confined space. It is evident that in a room in which the space is occupied by heated air, the heat resists the ordinary avenues of escape, such as the doors and windows, the law being that the rarefied air, having a force in itself, rises to the top of the room and there remains, the attraction of the molecules of heat being the conductive agency. In a room in which the air is charged with carbonic acid gas, ventilation is acquired, in my invention, to the atmosphere, by its own specific gravity.

The invention is shown in its preferred form of application in the accompanying drawings, in which—

Figure 1. is a vertical sectional view of a house in which the invention is installed. Fig. 2. a vertical sectional view of a house as ordinarily arranged for ventilation, showing the invention thus applied. Fig. 3. is a view of the direct and indirect inductive ventilator applied to flat roofs. Figs. 4. and 5. are enlarged views in perspective of the direct and indirect ventilators, differing slightly in construction applied to the roof above the confined air space. Fig. 6. is a vertical transverse sectional view of Fig. 4., and Fig. 7. is an enlarged detail view in perspective of the valve in the roof ventilator. Fig. 8. is a cross-section of the ventilator arranged for direct and indirect induction of heated air transmission heating solar rays. Fig. 9. is a view of the ventilator as applied to air shafts.

In the drawings corresponding parts are designated by like reference numerals.

10, indicates rooms or apartments of a house within the outer walls, 12, and separated from each other by an intermediate vertical partition, 15. These rooms serially are divided into upper and lower compartments, 16. designating the floor beams of the two lower compartments, and, 17, the floor beams of the two upper compartments. 18 designates the ceiling floor beams of the two upper compartments, above which is the inflation chamber or attic 19, which is also beneath the roof, 20, of the building.

For the ventilation of the rooms, 10, an air duct or passage, 21, is made in the partition, 15, for the reason that the partitions are within the spaces of the rooms in which the air is usually higher in temperature and more vitiated than the air near the outer walls, 12. The air duct, or conductor, 21, may be similar to that employed for the transmission of furnace heated air, especially in wood partitions if desired, and in fire-proof walls the hollow tile or blocks may be conveniently used, set endwise in position.

As an adjunct to the duct or passage, 21, between the floor beams, 17, and, 18,—in the central portion of the building, and between the floor, 17x17°, and ceilings 17x17° of the respective floors are located the air ducts, or conductors, 22. The outer ends of these conductors in the direction of the walls, 12, of the building, are closed, and terminate at any convenient point past the central portion of the ceiling, and from the lower portion of the conductors extend downwardly through the ceiling, the short valved conductors, 24. The inner ends of the conductor, 22, between the floor beams, or the separate compartment, 10, connect with each other; and the respective upper and lower ends of the duct, 21, in the partition, 15, and which is within the partition in the upper compartment, connect respectively with the lower and upper portions of the horizontal conductor between the floor beam, 17, and, 18. From the lower portion of the conductor between beams, 17, extend downward in the partition in the lower compartment a short distance, so as to take the heat from the upper portions of the rooms of the lower compartments, and into which openings, 25, extend through the wall, and which are closed by the valves, 26. The conductors, 22, between the beams, 18, are provided with a large opening, 27, which leads to the inflation chamber, 19, and in which are valves, 28, for closing the opening. The conductors, 24, in the lower portions of the conductors, 22, are placed directly above the burners, or lamps, 28, which are near the ceiling of the upper and lower compartments, and supported by the usual fixtures, 29, from the ceiling.

Heated air in the rooms of the upper and lower compartments arises in a body to the ceilings of the rooms, and when the valves are opened to the ducts, or conducts, 22, pass upwardly through the conductor in the partition into the inflation chamber, 19. The rarefaction of the air in the chamber, 19, will therefore govern the induction of the heated air into the inflation chamber, 19, the temperature in which chamber is increased by the heat from the roof, 20. The heated currents from a heating source, such as the burners, or lamps, 28, increase the inductive energy of the heated body of air, and the currents of heated air ascend to the inflation chamber with a consequent reduction of temperature in the rooms or spaces to be ventilated. Heating agents of various kinds are made serviceable in the induction of the heat, the heated air surrounding the heating agent, will attract heated air remote from the agent, and this molecular attraction of heat is followed through the ducts, 22, and, 21, to a rarefied condition of air in the inflation chamber, 19, subject to high degrees of temperature, especially from the summer heat. The ventilation of the inflation chamber, 19, is effected, in my invention, by a direct and indirect system of heat induction; that is, the air currents are caused to ascend in waves for a distance, and then expelled direct into the atmosphere without being impeded. The preferred manner of effecting the results is by making a rectangular shaped opening in the roof, 20, of the building, and extending a proper distance in the direction of the comb of the roof, and of the proper width as indicated at, 30. Within this opening is fitted a rectangular shaped box, frame, or casing, 31. The view externally of the box, frame, or casing being seen in Fig. 4. The ventilator casing is open at the top and bottom to give free passage therethrough of the air currents, and at the top is preferably covered with wire mesh, or screen, 32. The lower portion of the ventilator frame extends ordinarily a short distance within the inflation chamber, 19, a distance equal to the thickness of the rafters supporting the roof. The sides, 33, of ventilator frame just above the line of the upper surfaces of the roof are longitudinal openings 35, and, 36, which are narrow in width.

A longitudinal air deflecting wall, or plate, 37, extends from a point equi distant from the inner surfaces of the sides, 34, or the vertical axial center of the ventilator frame, 31, and a short distance upwardly from a line extending horizontally through the opening, 35, and is inclined downwardly in a slight degree, and extended through the opening, 35, and upon the upper surface of the roof, 20, the plate being secured at the ends by soldering to the inner surfaces of the ends of the ventilator frame, and to the lower edge of the longitudinal opening, 35, in the same manner.

An outwardly curved longitudinal air deflecting wall, or baffle plate, 38, extends from a point approximately equi distant from the upper and lower portions of the ventilator frame, and at a distance above and in a slight degree past a vertical line, extending through the inner end of plate, 37, and toward the side of the ventilator frame having the opening, 35, this distance being determined so as to afford a circuitous air passage, 38ˣ, of sufficient height to permit the volume of heated air to pass upwardly with the least friction. The ends of the plate, 38 are secured by soldering to the inner surface of the ends, 34, of the ventilator frame, and the plate inclines downwardly and extends through the longitudinal opening, 36, in the side of the ventilator frame, and is bent upwardly to conform to the pitch, and attached to the upper surface of the roof, 20, the proper distance, it being observed that the openings, 35, and 36, are of sufficient width to afford passages above the upper surfaces of these plates, for the discharge of water, which might be precipitated upon their surfaces. In the same side of the ventilator box having the longitudinal opening, 35, and approximately intermediate the said opening, and the line of the upper portion of the ventilator frame, is a longitudinal opening, 39.

40, indicates an outwardly curved, outer air deflecting or baffle plate, the upper portion of which plate extends to a position in line with the upper portion of the ventilator casing, and past the vertical line extending through the inner portion of plate, 37, to afford a passage, or exit, 41, of a comparative width of the passage 38ˣ—between plates, 38, and, 37. The lower ends of baffle plate, 40, being extended downwardly through opening, 39, and secured by solder to the ends, 34, of the ventilator frame and to the lower edge of opening, 39, in the same manner as the plates, 36, and, 37. The circuitous passage, 38ˣ is closed by a longitudinal valve plate, 42, hinged by the hinges, 43, to the upper surface and inner end of the plate, 37. This valve plate is provided with a longitudinal weighted bar, 44, on its rear surface, and outer end portion, so as to retain its position normally open, and when closed, contacts with a bead, 45, on the inner surface of the plate, 36.

A curved arm, 46, is connected with the inner face of the valve plate, 39, and extends outwardly and downwardly from the hinged point of the valve plate. A cord, or rope, 47, extends from the arm, 46, downwardly within the compartments of the building, and secured to a hook, 48, in one of the rooms, 10, by means of which rope the valve is closed.

The security of the ventilator box within the opening in the roof, 20, as well as protection from the rain, is afforded by the angularly bent plates, 49, conforming to the pitch of the roof, and secured to the outer surfaces of the ends, 34, of the ventilator box,—portions of the lower ends of which plates extend toward and are soldered to the ends of the respective plates, 37, and, 38, thus making with the same plates a continuous flushing around the casing, 31. In opening of the valve, 42, in the ventilator, 31, the liberation of the body of heated air from the inflation chamber, 19, causes an inflow of the heated air from the ventilating ducts, 22, and, 21, from the rooms, 10, creating a vacuum in the rooms for the supply of pure air through the ordinary open passages afforded by doors and windows, and in drafts, produce a cooling of the air within the rooms.

In ordinary ventilators the passage of the heated air directly upward into the atmosphere is prevented by caps, which act as dampers, and the body of heated air is not expelled, and has a tendency to reverse the law of nature and ooze out, therefore no induction can follow. The results of my invention are found to reduce the temperature in the heated term, within the inflation chamber, 19, very rapidly, and the temperatures of the air within the rooms of the building are maintained normally below the temperature of the air outside of the building. The action of the currents of air through the ventilator, 31, is automatic. With the temperature outside the building at 90° Fahrenheit, the heat absorbed by the roof, 20, produces rarefaction in the air of chamber, 19, and the currents of air flow steadily through the ventilator, producing air currents through the doors and windows, the cooling taking place from the passage upwardly of the heated air. Upon the decrease of the heat upon the roof, particularly after sunset, the temperature in the expansion chamber, 19, becomes nearly of the same degrees as the temperature outside the building, and while the upward ascent of the heated air is slower, the rooms of the building remain cool and lower in temperature than the air outside of the building, while the entry of cold currents downwardly through the ventilator is resisted by the volume of heated air in the chamber, 19. The valves, 26, in the passages, 25, may be closed when the burners are ignited, and during the use of the lamps (or burners, and upon disuse, the valved passages, 24, may remain closed while the passages, 25, remain open. The ventilation of the rooms of the building, and the purity of air is further maintained in the discharge of the air which is charged with carbonic acid gas, and therefore heavier than common air. This discharge as accomplished through ducts, or passages, 51, made in the walls of the building, and which have passages, 52, leading thereto from the lower portion of the adjacent rooms, 10, usually at the line of the baseboards of the room. The lower end of the duct or passage extends downwardly into the foundation walls, and thence by a branch passage, 54, to the outer surface of the wall, the specific gravity of the heavy gas finding its natural conductivity toward the ground.

In adapting the system of ventilation to its simplest form, as shown in Figs. 2. and 3., where the passages, or air shafts are the halls for the stairs in one instance, and the open windows in the walls of the building on another,—the former being from the upper portion of the room, through the openings, 52, into the halls. From the halls the heated air passes up the course indicated by the arrows in Fig. 2., into the upper inflation chamber, 53, which is the same as the chamber, 19, with the exception that the chamber is finished for occupancy, and provided with a ceiling, 54, the ventilator being the same as in Fig. 1., with the exception that its lower portion is extended downwardly through the ceiling, 54.

A valved opening, 55, is made through the partition above the door casing leading to the inflation chamber, so that when the door, 56, is closed, the heated air may pass upwardly from the halls, through the passage, 55, into the inflation chamber.

In Fig. 3. the ingress of air is through the openings, 57, in the walls of a building, and in which the roof for the building is comparatively flat. For the latter roof, 58, the opening, 59, is made near the front wall, 60, of the building, as the heated space enlarges in that direction. The surface of the upper plate, 40, which corresponds to the plate, 61, in the ventilator, 31, is exposed to the heating rays of the sun, and being curved outwardly, as seen in Fig. 5., and from which casing the portion of the ends are removed, on the section lines shown in Fig. 6. For purposes of admitting the heating rays of the sun direct to the inflation chamber, the plates, 41, and, 37, may be transparent, as in Fig. 7., the plates, 62, and, 63, and, 64, which are preferably made of glass, correspond respectively with the plates, 40, 37, and, 38.

When the air deflectors are transparent, or made of glass, in order to maintain a given vent for the heated air, it is necessary to make the frame, or casing, 31, higher than when these plates are of metal, for the reason that the metal can be curved readily, so as to give definite proportions to the air passages.

The principle of direct ventilation, as applied to air shafts, is shown in Fig. 9., in which the heated air currents pass unrestricted into the atmosphere, and causing a draft through the passages, 66, of the tubular ventilator shaft, 65, and producing an induction by the outward ejection of heated currents of fluid, such as follow the ascending of rarefied air, or forced through the shaft, and from boiler rooms, where the temperatures are increased by furnace heat.

The proportions of the ventilator and ducts are best adapted to the volume and the inertia of the heated air to be moved, thus obtaining the rapid action of currents of air to disturb and cool a given volume of confined air, and which may be rarefied by action of heat, and the inflation chamber exhausted periodically by the valve.

I am aware that baffle plates have been employed in chimneys to induce a zig zag course to the smoke, which plates are inclined upwardly and at an angle to the inner surfaces of the chimney. The body of the smoke however moves in vertical lines after passing each baffle plate. With air free from smoke, a circuitous passage as in my invention for the ventilating air currents causes these currents to move from the arc of one surface to the arc of another surface in adjacent opposed positions, the result of which is, that the down drafts from adjacent roofs or walls toward the ventilator, and which move in the direction of the least resistance are deflected by the outer curved surfaces of the baffle plates, and pass out of the openings in the sides of the ventilator casing, while the ventilating currents are not impeded and find free exit. In hot blast chimneys the heated air overcomes the low temperature above the chimney but in ventilators of air provision must be made for counter currents for which the ordinary baffle plate is inadequate.

Having fully described my invention, what I now claim as new, and desire to secure by Letters Patent is:—

1. In house ventilation a structure having a roof, and a chamber beneath the roof, a ventilator casing extending from the chamber upwardly through the roof having an opening extending therethrough, and air controlling baffle plates spaced apart one above another, and extending from opposite inner surfaces of the sides of said casing in the arc of a circle.

2. In house ventilation a structure having a roof, and a chamber beneath the roof, a ventilator casing having an opening extending therethrough, air controlling baffle plates spaced apart one above another extending from opposite inner surfaces of said casing in an arc of a circle and terminating upon opposite sides respectively of the vertical axial line of the ventilator casing.

3. In house ventilation a structure having a roof, and a chamber beneath the roof, and an opening in the roof, a ventilator casing or frame in said opening, said casing having an opening extending therethrough, and longitudinal openings in the sides of the casing, outwardly curved air deflecting or baffle plates on opposite inner surfaces of the sides of said casing, one of said plates extending inwardly and above another to form a direct and indirect passage for the currents of air between said plates, and extending outwardly through said longitudinal openings in the sides of said casing.

4. In a ventilator casing having an opening therethrough, an outwardly curved baffle plate extending from one side of said casing, and partially closing the opening in the outer end of said ventilator casing.

5. In a ventilator casing having an opening extending therethrough, a baffle plate forming a part of one of the sides to said casing, and having an outwardly curved outer end portion partially closing the opening at the outer end of said casing.

6. In a ventilator a ventilator shaft having a circuitous passage for the air at its outer end, and baffle plates forming the walls to the passage having adjacently opposed circuitous inner surfaces.

7. In a ventilator a ventilator shaft having a circuitous passage for the air at its outer end, and baffle plates forming the walls to the passage having adjacently opposed circuitous inner surfaces for the currents of air, and openings in the shaft for admitting the air external to the shaft within said circuitous passage.

8. In a ventilator a ventilator shaft having a circuitous passage for the air at its outer end, and baffle plates forming walls to the passage having adjacently opposed circuitous inner surfaces for the currents of air, and openings in the shaft for admitting the air external to the shaft within said circuitous passage and means for controlling the passage of air through said circuitous passage.

9. In ventilators, a casing having openings in the sides thereof, baffle plates within said casing and a flashing comprising outwardly extended portions of the baffle plates and plates on the ends of said casing connected together.

RUSH W. CARRINGTON.

Witnesses:
FRANK H. AUSTIN,
J. H. HAWTHORNE.